March 15, 1955
C. L. STIDD
2,704,137
WHEEL FLANGE LUBRICATOR
Filed Aug. 4, 1952
3 Sheets-Sheet 1
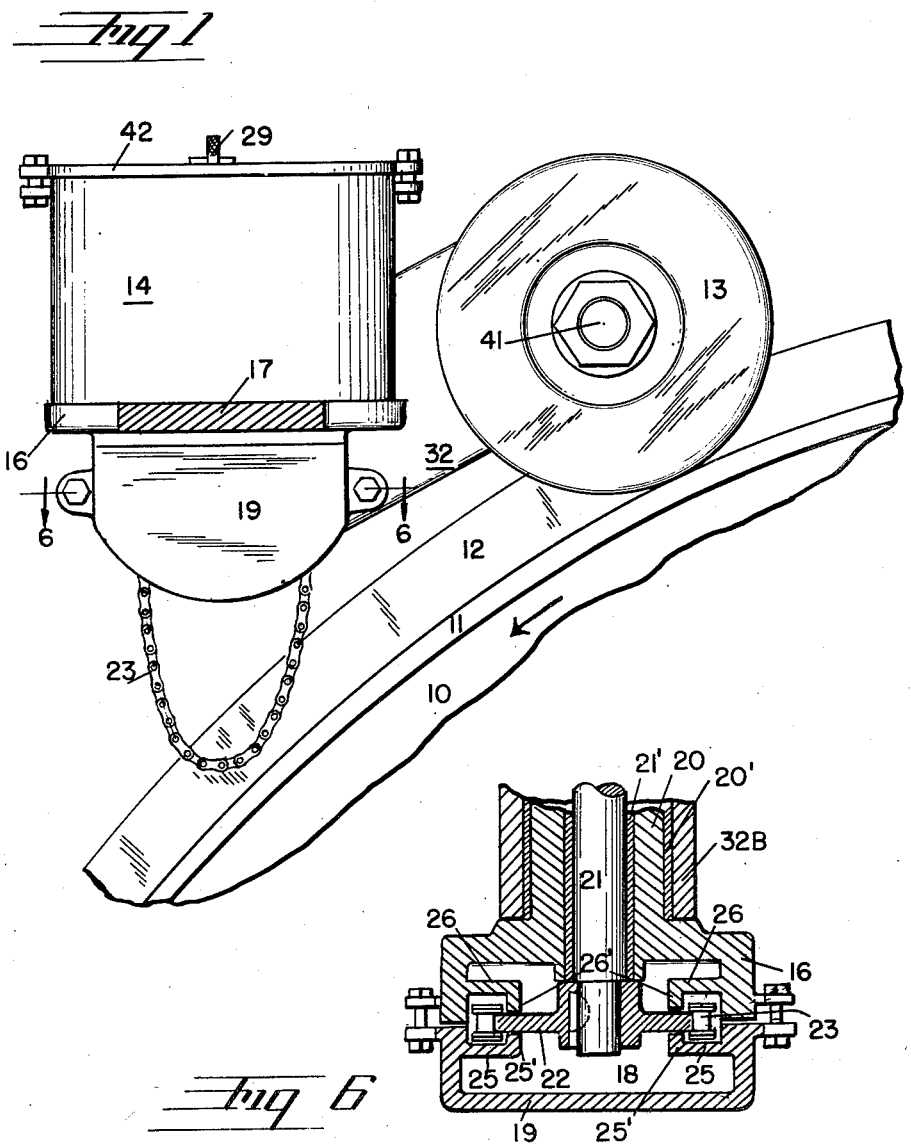
INVENTOR.
CHARLES L. STIDD
BY
F. R. Geisler
ATTORNEY March 15, 1955   C. L. STIDD   2,704,137
WHEEL FLANGE LUBRICATOR
Filed Aug. 4, 1952   3 Sheets-Sheet 2
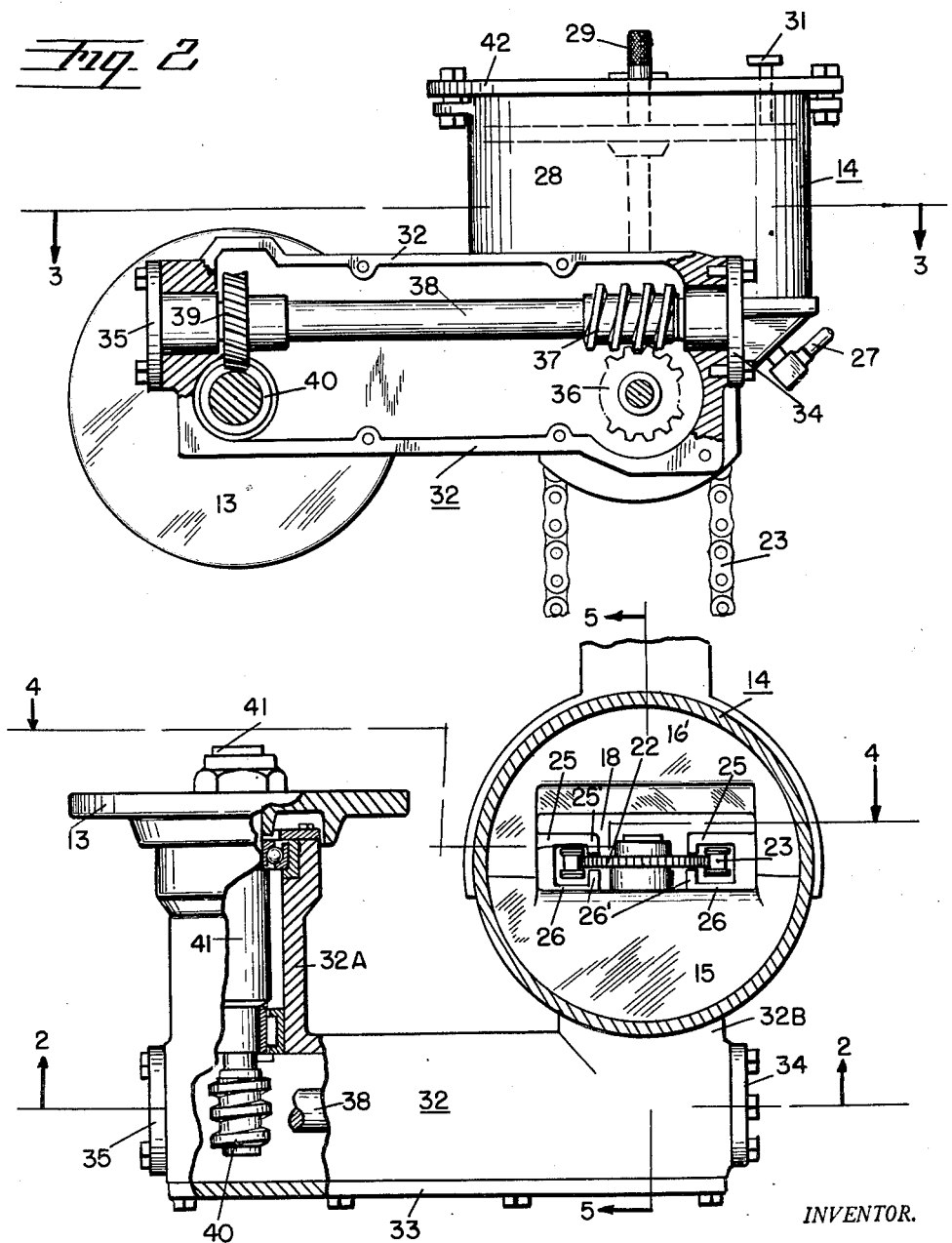

March 15, 1955  C. L. STIDD  2,704,137
WHEEL FLANGE LUBRICATOR
Filed Aug. 4, 1952  3 Sheets-Sheet 3
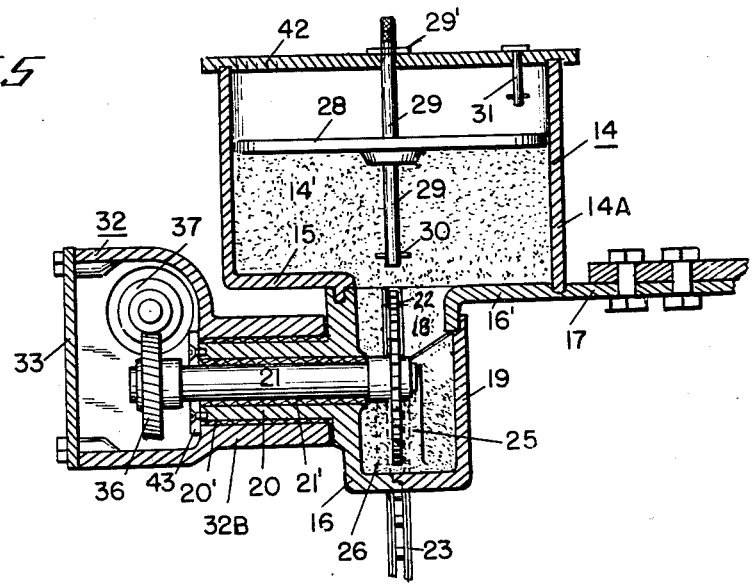
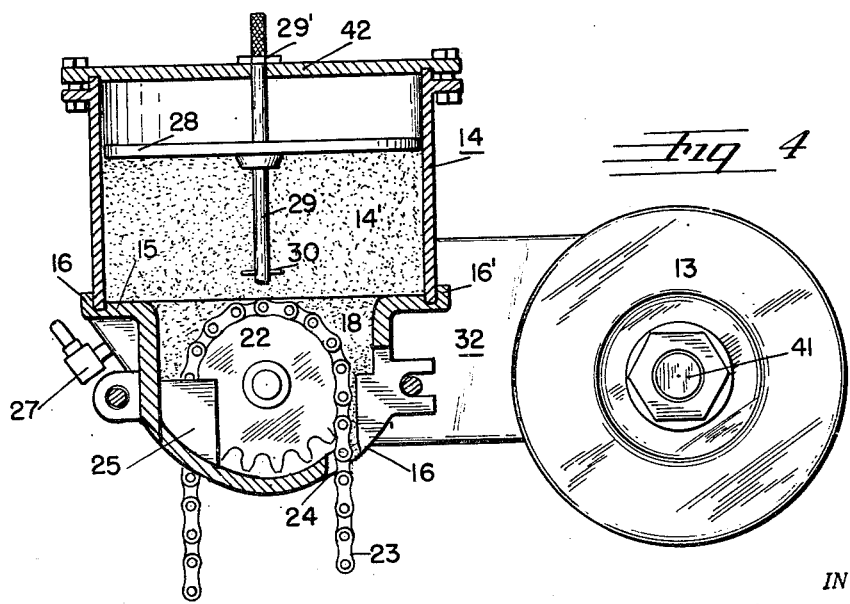
INVENTOR.
CHARLES L. STIDD
BY
F.R.Geisler
ATTORNEY

United States Patent Office 2,704,137
Patented Mar. 15, 1955

2,704,137

WHEEL FLANGE LUBRICATOR

Charles L. Stidd, Portland, Oreg., assignor to Rail Flange Lubricator Co., Portland, Oreg., a corporation of Oregon Application August 4, 1952, Serial No. 302,553

2 Claims. (Cl. 184—3)

This invention relates in general to the lubrication of the flanges of the wheels of locomotives and other rolling stock operating on track rails. As is well known, such lubrication if properly applied, reduces the rail friction, particularly that incurred at curved portions of the track, and reduction of such rail friction means less wear on wheel flanges, less wear on the rails, and also reduction in the amount of extra power required to move the locomotive and other cars on the curved portions of the track.

An object of this invention is to provide an improved wheel flange lubricator which will operate automatically to supply the proper desired amount of lubrication to the flange of the wheel and thence to the side face of the rail on which the wheel is traveling whenever, or as long as, the wheel travels along the track.

A related object of the invention is to prevent excessive lubrication of the wheel flange or associated rail and to prevent continuation of the lubrication during such time as the wheel is at rest.

It is customary to use, as a lubricant for wheel flanges and the contacted sides of the track rails, switch points, frogs, etc., heavy grease, graphited grease, and similar lubricants, and because of the extremely viscous or semi-solid consistency of such lubricants, it is necessary not only to furnish a container or supply tank with the lubricant for the flange lubricator, but also to insure the proper and even dispensing of the lubricant from such supply.

A special object of the present invention therefore is to provide improved means for maintaining a constant flow of the lubricant from the lubricant container or reservoir of the device together with cooperating distribution means for transferring the lubricant in predetermined constant quantity to the wheel flange as required.

An additional object of the invention is to provide a device, capable of accomplishing the above mentioned objects, which will be simple and practical in construction, embodying no unnecessary mechanism, and requiring only a minimum amount of care in its operation and maintenance.

The manner in which these objects and other incidental advantages are attained with my improved wheel flange lubricator, the manner in which the lubricator is constructed, and the manner of its operation, will be readily understood from the following brief description in which reference is made to the accompanying drawings.

In the drawings:

Fig. 1 is a front elevation of my wheel flange lubricator showing the same in mounted position and in operation;

Fig. 2 is a sectional elevation of the wheel flange lubricator taken from the opposite side, the section being on the line indicated at 2—2 in Fig. 3, the lubricator being removed from its mounting position on the vehicle;

Fig. 3 is a plan view and plan section on line 3—3 of Fig. 3, a portion being shown broken away for the sake of clarity;

Fig. 4 is an elevation or sectional elevation corresponding to line 4—4 of Fig. 3;

Fig. 5 is a sectional elevation on line 5—5 of Fig. 3; and

Fig. 6 is a fragmentary section on line 6—6 of Fig. 1 but drawn to an enlarged scale.

Referring first to Fig. 1, 10 indicates a portion of a locomotive wheel or vehicle wheel, the flange of which is being lubricated, the wheel having the customary rim 11 and flange 12. Lubricant is applied to the wheel flange through the medium of an endless chain 23 which hangs down into contact with the face of the flange 12 to be lubricated. Lubricant is supplied to the chain from a main container indicated in general by the reference character 14 in a manner hereinafter described. A lubricator drive wheel 13 rides on the rim 11 of the vehicle wheel and is rotated by the latter. Rotation of the lubricator drive wheel 13, through the intermediary of suitable gear connection, results in slow movement of the lubricant-carrying chain 23.

The lubricant container 14, as shown best in Figs. 4 and 5, includes an upper main chamber 14', surrounded by a cylindrical wall 14A having an integral substantially semi-circular bottom partition 15 on one side which terminates near the center of the bottom and which cylindrical wall 14A and bottom partition 15 are mounted on a main base casting 16. The main base casting 16 has a top partition 16' which extends over the remaining bottom portion of the upper chamber 14' but through which there is a rectangular passageway leading downward from the upper chamber 14 to a lower chamber 18. The upper partition 16' of the base casting 16 is extended beyond the wall 14A at one side so as to form a bracket arm 17 by means of which the entire device is mounted in position on the vehicle. The housing enclosure for the lower chamber 18 is completed by a removable companion housing member 19.

The main base casting 16 has an integral tubular extension 20 (Fig. 5) in which a sprocket wheel shaft 21 is journaled. A sprocket wheel 22 is secured to the end of the shaft 21 within the lower chamber 18. The lubricant-carrying chain 23 is a sprocket or block chain which passes around and is supported by the sprocket wheel 22 and meshes with the teeth of the sprocket wheel. The base casting 16 and the companion housing member 19 are so formed as to provide a pair of openings 24 (one of which is shown in Fig. 4) in the bottom of the lower chamber for the chain 23.

The rotation of the sprocket wheel 22 and the resulting movement of the chain 23 into and out of the lower chamber 18, when the chamber 18 is filled with lubricant grease will cause the lubricant grease to be carried by the chain and deposited on the vehicle wheel flange with which the bottom loop of the chain is in contact.

The upper chamber 14' and lower chamber 18 are filled with lubricant grease supplied to these chambers through a suitable grease inlet coupling of usual construction which is indicated at 27 in Fig. 4. A cover plate 42 is bolted or otherwise removably secured in place on the top of the container 14 and seals the top or upper chamber 14'. A disk weight 28, the diameter of which is only slightly less than the inside diameter of the cylindrical wall 14A surrounding the upper grease chamber 14' is slidably mounted on a guide and lift rod 29. The rod extends through a central aperture in the cover plate 42 and is slidable therein. A suitable pin 29' or other engaging means near the top end of the rod 29 prevents the rod 29 from sliding down entirely through the cover plate 42. A pin 30 near the bottom of the rod 29 enables the disk weight 28 to be raised manually in and from the upper chamber 14'.

Due to the semi-solid condition of the lubricant grease employed for wheel flange and rail lubrication, it is necessary to provide some means for preventing the forming of a path or grease tunnel for the chain 23 in the grease in the lower chamber 18, otherwise there would be considerable probability that the chain would soon fail to contact the grease when traveling through the chamber 18 and thus would fail to carry the grease to the vehicle wheel flange. To prevent such possibility I provide the disk weight 28 which normally will rest on top of the grease in the upper chamber 14'. The weight of this disk, in cooperation with the vibration to which the entire device is subjected when the vehicle is in motion, will maintain the grease in the chamber 14' and particularly grease in the lower chamber 18 under sufficient pressure so that any tunneling of the grease or the wearing of a path through the grease by the chain 23 will not be possible. This is one of the important features of my invention.

I have found that the disk weight 28 ordinarily need not be very heavy for exerting the necessary pressure to maintain the grease in constant contact with the chain, since the constant vibration of the device when the vehicle is in operation aids the disk in accomplishing its purpose. However, without the disk weight I have found that it is necessary then to have some other and probably more elaborate or complicated means for accomplishing this same purpose. If unusually heavy grease is being used as the lubricant and the disk 28 is not sufficiently heavy to exert the necessary pressure to prevent the tunneling or wearing of a path through the grease by the chain, additional weights can easily be attached to the top of the disk 28.

A grease gauge pin 31 (Fig. 5) is slidably mounted in another aperture in the cover plate 42. This gauge pin 31 has an enlarged head to hold it from dropping down through the cover plate and the gauge pin extends down a short distance below the cover plate as shown. As will be apparent from Fig. 5, when the container becomes filled with the grease lubricant the disk weight 28 will push the gauge pin 31 into raised position, thus indicating from the outside that the upper chamber 14' is full of grease.

In order to prevent excessive amounts of grease being carried by the applicator chain through the particular opening 24, through which the chain happens to be passing in a downwardly direction, and similarly in order to prevent excessive grease being carried through the other opening 24 when the direction of the movement of the chain is reversed with the reversal of rotation of the vehicle wheel 10 (Fig. 1) and consequent reversal of rotation of the lubricator drive wheel 13, I provide a pair of walls 25 and 26 (Figs. 3, 5 and 6) which extend upwardly into the lower chamber 18 from each of the openings 24 on opposite sides of the sprocket wheel 22 and thus adjacent the two faces of the chain respectively.

It will be apparent from Fig. 6 that the amount of grease which can be carried downwardly by the chain will be restricted to that which will be able to pass down inside the walls 25 and 26. Only one face of the chain (thus the rear face as viewed in Fig. 1) contacts the wheel flange 12 and the application of the grease takes place from this face of the chain only. It will be noted from Fig. 6 that the walls 26, which are positioned adjacent this face of the chain, are spaced further from the chain than the walls 25. Thus the walls 25 limit the amount of grease carried by the front face (as viewed in Figs. 1 and 6) of the chain as much as possible inasmuch as grease on the front face of the chain serves no purpose and excess grease on this front face might drop on to the rim 11 of the wheel (a condition which is of course to be avoided). On the other hand, the walls 26 at the rear face of the chain allow more grease to be carried by that face of the chain for the desired lubrication of the flange. This restriction of the amount of grease passing out of the lower chamber 18 on the chain is another important feature of my improved flange lubricator.

Inturned flanges 25' and 26' are provided along the inner vertical edges of the walls 25 and 26 respectively. These flanges act as guides for the chain and as strippers for the part of the chain moving downwardly on the sprocket wheel 22 to overcome any tendency for the chain to cling to the sprocket wheel teeth instead of passing downwardly directly from the sprocket wheel.

The rotation of the lubricator drive wheel 13, which is produced by its contact with the rim 11 of the vehicle wheel (Fig. 1), causes rotation of the sprocket wheel 22 (Figs. 3, 4, 5 and 6) and the movement of the grease applicator chain 23, through the intermediary of gear connection, and this gear connection will now be briefly described. The lubricator drive wheel 13 (see Fig. 3) is secured on the end of a shaft 41 journaled in suitable bearings located in one arm 32A of a U-shaped housing 32. The opposite or inner end of the shaft 41 carries a worm 40 which meshes with a worm gear 39 (see Fig. 2) on one end of a shaft 38 journaled in suitable bearings (not shown) within the central portion of the U-shaped housing 32. The other end of the shaft 38 carries a worm 37 (see Figs. 2 and 5) which meshes with a worm gear 36 mounted on the inner end of the sprocket wheel shaft 21. The sprocket wheel shaft 21 is journaled in the bushing 21' in the tubular extension 20 of the base casting 16, previously described. The arm 32B of the U-shaped housing 32 is pivotally supported on this extension 20 through the intermediary of a bushing 20'. A thrust washer 43 (Fig. 5), secured by suitable screws on the inner end of the extension 20, keeps the housing arm 32B from slipping off of its mounting on the base extension 20.

A removable plate 33 (Fig. 3) covers one side of the central main portion of the U-shaped housing 32 so as to provide access to the gears, shaft and bearings located therein, and removable end plates 34 and 35 are provided for the same reason. Suitable grease fittings and oil plugs (not shown) are provided in the housing 32 to facilitate the keeping of the gears and shaft bearings properly lubricated. Since the housing 32 is pivotally mounted on the tubular base extension 20, when the container with its base casting 16 is secured in place on the vehicle, the free end of the housing 32 will be supported by the lubricator drive wheel 13 riding upon the vehicle wheel 10 as illustrated in Fig. 1.

The device will operate regardless of the direction in which the vehicle moves inasmuch as reversal of the direction of rotation of the vehicle wheel and consequent reversal of the direction of rotation of the lubricator drive wheel 13 will result merely in reversal of movement of the applicator chain 23. The chain 23 will function to apply the lubricating grease to the vehicle wheel flange 12 as desired when moving in either direction, the assumed normal direction of the vehicle wheel rotation being that indicated by the arrow in Fig. 1.

With the device installed in place on the vehicle the filling and refilling of the grease container chambers 18 and 14' with the lubricant grease is quickly and easily done through the grease inlet coupler 27. The indicator 31 will show whether or not there is a full supply of grease in the container. The grease will be evenly and constantly supplied to the moving applicator chain in the lower grease chamber 18 and deposited by the applicator chain on the vehicle wheel flange whenever the vehicle is in motion, and no excessive amount of grease will be carried by the chain from the lower grease chamber 18.

Various minor modifications could be made in my improved wheel flange lubricator without departing from the principle of my invention. Thus it would be possible to change the shape and actual construction of the grease container and the various gear connections by which the lubricator drive wheel 13 is connected to the chain sprocket wheel 22. It is not my intention to limit my invention otherwise than as set forth in the claims.

I claim:

1. A locomotive wheel flange lubricator of the character described including a lubricant container comprising a main upper chamber and a smaller lower chamber connected with said main chamber by a restricted passageway in the bottom of said main chamber, means for delivering lubricant into said container, a driven sprocket wheel located entirely in said lower chamber, a lubricant applicator consisting of an endless sprocket chain passing around and driven by said sprocket wheel and extending down below said lower chamber with one face of said chain adapted to contact the locomotive wheel flange, a pair of openings for said chain in the bottom wall of said lower chamber, in-turned flanges around said openings preventing the passage of an excessive amount of lubricant from said lower chamber on said chain, and means in said main upper chamber for maintaining the lubricant in said upper chamber, and therewith in said lower chamber, under sufficient pressure to maintain said lower chamber filled with lubricant as long as there is any lubricant in said upper chamber and prevent the wearing of a path through said lubricant in said lower chamber by said chain and said sprocket wheel.

2. A locomotive wheel flange lubricator of the character described including a lubricant container comprising a main upper chamber and a smaller lower chamber connected with said main chamber by a restricted passageway in the bottom of said main chamber, means for delivering lubricant into said container, a sprocket wheel located entirely in said lower chamber, means, driven by said locomotive wheel, for driving said sprocket wheel, a lubricant applicator consisting of an endless sprocket chain passing around and driven by said sprocket wheel and extending down below said lower chamber with one face of said chain adapted to contact the locomotive wheel flange, a pair of openings for said chain in the bottom wall of said lower chamber, in-turned flanges around said openings preventing the passage of an excessive amount of lubricant from said lower chamber on said chain, and a disc weight in said main upper chamber having approximately the same area as the interior of said upper chamber and adapted to rest on top of the lubricant in said upper chamber for maintaining the lubricant in said upper chamber, and therewith in said lower chamber, under sufficient pressure to maintain said lower chamber filled with lubricant as long as there is any lubricant in said upper chamber and prevent the wearing of a path through said lubricant in said lower chamber by said chain and said sprocket wheel.

References Cited in the file of this patent

UNITED STATES PATENTS

| | | |
|---|---|---|
| 723,290 | Luhr | Mar. 24, 1903 |
| 1,732,725 | Kohl | Oct. 22, 1929 |
| 2,626,680 | Burrell | Jan. 27, 1953 |